United States Patent Office 3,000,870
Patented Sept. 19, 1961

---

3,000,870
ALKYL AND ARYL BIS (CYCLOPENTADIENYL) TITANIUM-TITANIUM TETRACHLORIDE POLYMERIZATION CATALYSTS AND PROCESS FOR POLYMERIZING OLEFINS THEREWITH
Piero Pino and Giorgio Mazzanti, Milan, Italy, assignors to Montecatini, Societa Generale per l'Industria Mineraria e Chimica, Milan, Italy
No Drawing. Filed June 10, 1958, Ser. No. 741,012
Claims priority, application Italy June 14, 1957
13 Claims. (Cl. 260—93.5)

This invention relates to new polymerization catalysts and to polymers of unsaturated hydrocarbons produced with the use thereof.

Earlier applications in which we are co-inventors disclose the polymerization, at low temperatures and pressures, of higher alpha-olefins, di-olefins having a terminal double bond, and acetylenic hydrocarbons, in the presence of catalysts containing at least two atoms of different metals at least one of which is a transition metal of Groups IV to VIII of the Periodic Table (Mendeleef) and at least one of which is selected from among the metals of Groups I to III of said Periodic Table.

An object of this invention is to provide new catalysts for the polymerization of monomers of the types mentioned.

Another object is to provide a new method for polymerizing said monomers at low temperatures and pressures in the presence of the new polymerization catalysts.

These and other objects are accomplished by means of catalysts containing, as metal components, one or more transition metals, and organometallic bonds.

The new catalysts of this invention are obtained by reacting an organometallic compound of a transition metal of Groups IV to VIII of the Periodic Table (Mendeleef) with a halide of the same transition metal or of a different transition metal.

More specifically, the present catalysts can be obtained by reacting alkyl or aryl derivatives of bis(cyclopentadienyl) complexes of transition metals, especially such complexes of transition metals of Group IV, V and VI of the said Periodic Table, such as titanium, vanadium, and chromium, with halides of the same or another transition metal of Groups IV to VIII of the Periodic Table.

A characteristic of our new catalysts is that they contain at least two metal atoms (which may be atoms of the same metal) in a different combination state.

Complexes which may be used as one component of the catalysts include the dimethyl- and diphenyl- ditolyl derivatives of bis(cyclopentadienyl) complexes of Ti, V, or Cr. Transition metal halides which can be used as the second catalyst-forming component are, for example, the chlorides of Ti, V, Zr, Cr, Mo, etc.

Reaction products of these two components have not been known heretofore. We find that the reaction proceeds readily at moderate to relatively high temperatures, e.g. at temperatures between 20° C. and 100° C. Preferably, the reaction is carried out in the presence of a non-polymerizable hydrocarbon which is a solvent for at least one of the components of the reaction mixture, i.e., for the alkylated or arylated bis(cyclopentadienyl) complex of the selected transition metal, or for the transition metal halide. Examples of non-polymerizable hydrocarbons which can be used as the liquid reaction medium in preparing the catalysts are benzene and n-heptane.

The molar ratio of the organometallic compound (complex) to transition metal halide may vary within a wide range, such as from 1:1 to 10:1. The reaction product of the two components is, in general, at least partially insoluble in the liquid reaction medium. It can be isolated from the medium for subsequent use or the monomer to be polymerized can be introduced into the crude reaction mass comprising the reaction product of the organometallic compound and the transition metal halide in the solvent, and polymerized therein.

Our new catalysts are particularly effective aids for the polymerization of ethylene, aliphatic alpha-olefins such as propylene, butene-1, styrene, etc., and di-olefins containing at least one vinyl double bond.

The polyethylene produced in the presence of these new catalysts is highly crystalline. Polymeric alpha-olefins, such as polypropylene, produced by the present method comprise mixtures of atactic and isotactic (crystalline or crystallizable) polymers as described earlier in the Natta et al. applications and in the literature, and which can be separated on the basis of the differences in their steric structures by means of selective organic solvents.

Thus, we have obtained crude polypropylenes which are, to the extent of 50% thereof, non-extractable with boiling n-heptane and the non-extractable portion of which is isotactic and crystalline or crystallizable.

The polymers we obtain are, in general, linear polymers of high molecular weight.

The following examples are given to illustrate specific embodiments of the invention, it being understood that these examples are not intended as limiting.

*Example 1*

A solution of 3.3 g. of bis-cyclopentadienyl) titanium diphenyl in 150 cc. benzene, and a solution of 0.95 g. of titanium tetrachloride in 150 cc. benzene are introduced into a shaking stainless steel autoclave having a capacity of 1000 cc.

The mixture is heated to 60° C. with stirring, and ethylene is then introduced up to a pressure of 10 atm. Stirring is continued at 70° C. until the pressure drops to 6 atm. Ethylene is again introduced up to a pressure of 10 atm.

After a decrease in pressure of about 3 atm., the reaction is stopped, and the crude polyethylene is discharged from the autoclave and freed of inorganic impurities present therein by repeated treatment with hot hydrochloric acid.

The purified polyethylene is finally coagulated by adding an excess of methanol.

10 g. of polyethylene having a high molecular weight (intrinsic viscosity in tetrahydronaphthalene at 135° C.=11) are obtained. An X-ray examination shows that it is highly crystalline.

Approximately 3% of the polymer obtained can be extracted with boiling n-heptane.

The I.R. analysis shows that the extracted fraction contains phenyl groups bound to the polymer chains.

*Example 2*

A solution of 3.3 g. bis (cyclopentadienyl) titanium diphenyl in 150 cc. of benzene and a solution of 0.95 g. titanium tetrachloride in 150 cc. benzene are introduced into an autoclave as in Example 1.

The mixture is heated to 60° C. with stirring, and then 12 g. of propylene are introduced. After stirring the mixture for ten hours, the crude reaction mass is washed up by the procedure described in Example 1. X-ray analysis of the crude polypropylene obtained shows that it is about 50% crystalline.

Various changes in details may be made in practicing our invention without departing from the spirit thereof and therefore we intend to include in the scope of the appended claims all such changes and modifications as may be apparent to those skilled in the art.

We claim:
1. A polymerization catalyst consisting of the reaction product of (1) bis(cyclopentadienyl) titanium diphenyl, and (2) titanium tetrachloride, in a molar ratio of (1) to (2) of from 1:1 to 10:1.

2. The process for producing linear, high molecular weight, highly crystalline polyethylene which comprises polymerizing ethylene in the presence of a catalyst consisting of the reaction product of (1) bis(cyclopentadienyl) titanium diphenyl and (2) titanium tetrachloride, in a molar ratio of (1) to (2) of from 1:1 to 10:1.

3. The process for producing linear, high molecular weight polymerizates of propylene which exhibit crystallinity on X-ray analysis, which comprises polymerizing propylene in the presence of a catalyst consisting of the reaction product of (1) bis(cyclopentadienyl) titanium diphenyl and (2) titanium tetrachloride, in a molar ratio of (1) to (2) of from 1:1 to 10:1.

4. The process for producing linear, high molecular weight polymerizates of aliphatic alpha-olefins selected from the group consisting of ethylene, propylene, butene-1 and styrene which comprises polymerizing the alpha-olefin in the presence of a catalyst consisting of the reaction product of (1) bis(cyclopentadienyl) titanium diphenyl and (2) titanium tetrachloride, in a molar ratio of (1) to (2) of from 1:1 to 10:1.

5. The process according to claim 4, in which the alpha-olefin is propylene.

6. The process according to claim 4, in which the alpha-olefin is butene-1.

7. The process according to claim 4, in which the alpha-olefin is styrene.

8. The process for producing linear, high molecular weight, highly crystalline polymerizates of alpha-olefins selected from the group consisting of ethylene, propylene, butene-1 and styrene, which comprises polymerizing the alpha-olefin in the presence of a catalyst consisting of the reaction product of (1) a titanium complex selected from the group consisting of alkyl and aryl bis(cyclopentadienyl) complexes of titanium and (2) titanium tetrachloride, in a molar ratio of (1) to (2) of from 1:1 to 10:1.

9. The process according to claim 8, in which the alpha-olefin is ethylene.

10. The process according to claim 8, in which the alpha-olefin is propylene.

11. The process according to claim 8, in which the alpha-olefin is butene-1.

12. The process according to claim 8, in which the alpha-olefin is styrene.

13. A polymerization catalyst consisting of the reaction product of (1) a complex of titanium selected from the group consisting of alkyl and aryl bis(cyclopentadienyl) complexes of titanium, and (2) titanium tetrachloride, in a molar ratio of (1) to (2) of from 1:1 to 10:1.

References Cited in the file of this patent

Natta et al.: "La Chimica e l' Industria," vol. 39, p. 19–20, January 1957.